United States Patent
Spencer et al.

[11] Patent Number: 5,846,355
[45] Date of Patent: Dec. 8, 1998

[54] JACKET MATERIAL FOR PROTECTION OF ELECTRICAL CONDUCTORS

[75] Inventors: Mark S. Spencer; Edward A. Rubin, both of Phoenix, Ariz.

[73] Assignee: W. L. Gore & Associates, Inc., Newark, Del.

[21] Appl. No.: 621,806

[22] Filed: Mar. 22, 1996

Related U.S. Application Data

[60] Division of Ser. No. 321,634, Oct. 11, 1994, Pat. No. 5,519,172, which is a continuation-in-part of Ser. No. 305,477, Sep. 13, 1994, abandoned.

[51] Int. Cl.$^6$ .................................................. B65H 81/06
[52] U.S. Cl. ........................... 156/53; 156/52; 156/278; 264/171.24; 427/119; 427/387
[58] Field of Search ................. 156/47, 51, 55, 156/53, 52, 278; 264/171.24; 427/119, 387

[56] References Cited

U.S. PATENT DOCUMENTS

| | | | |
|---|---|---|---|
| 3,150,207 | 9/1964 | Gore | 260/327 |
| 3,217,083 | 11/1965 | Gore | 174/25 |
| 3,278,673 | 10/1966 | Gore | 174/120 |
| 3,828,119 | 8/1974 | Warburton et al. | 174/121 A |
| 3,953,566 | 4/1976 | Gore | 264/288 |
| 4,187,390 | 2/1980 | Gore | 174/102 R |
| 4,279,245 | 7/1981 | Takagi et al. | |
| 4,347,204 | 8/1982 | Takagi et al. | 264/127 |
| 4,347,336 | 8/1982 | Homan et al. | 524/731 |
| 4,386,170 | 5/1983 | Monroe | 523/210 |
| 4,557,957 | 12/1985 | Manniso | 428/36 |
| 4,613,544 | 9/1986 | Burleigh | 428/35.5 |
| 4,643,202 | 2/1987 | Roche | 128/786 |
| 4,720,400 | 1/1988 | Manniso | 427/243 |
| 4,791,966 | 12/1988 | Eilentropp | 138/154 |
| 4,862,730 | 9/1989 | Crosby | 73/38 |
| 4,945,125 | 7/1990 | Dillon et al. | 527/427 |
| 4,978,813 | 12/1990 | Clayton et al. | 174/117 F |
| 5,237,635 | 8/1993 | Lai | 385/101 |
| 5,286,924 | 2/1994 | Loder et al. | 174/117 F |
| 5,362,553 | 11/1994 | Dillon et al. | 428/246 |
| 5,437,900 | 8/1995 | Kuzowski | 428/36.1 |

FOREIGN PATENT DOCUMENTS

| | | |
|---|---|---|
| 0441140 | 8/1991 | European Pat. Off. . |
| 2696347 | 4/1994 | France . |
| 94/07565 | 4/1994 | WIPO . |

OTHER PUBLICATIONS

Literature: Mark E. Dillon, "Silicone and Poly(tetrafluoroethylene) Interpenetrating Polymer Networks, Brief History, Summary of Recent Developments, and Discussion of Applications," 1994, American Chemical Society, pp. 393–404.

*Primary Examiner*—Francis J. Lorin
*Attorney, Agent, or Firm*—Carol A. Lewis White

[57] ABSTRACT

The present invention is an improved jacketing material for all forms of electro-magnetic energy conductors. The jacket material of the present invention comprises a silicone material that is imbibed into a porous polymer, such as expanded polytetrafluoroethylene, to produce a flexible and durable composite. When applied as a cable jacket, the composite material of the present invention produces dramatic improvement over the use of silicone alone, especially in the areas of load sharing, resistance to fatigue from repeated flexure, and resistance to harsh environmental conditions. The ability of the material of the present invention to withstand repeated autoclave cycles without compromise makes it particularly suitable for cable jacketing in biomedical applications.

6 Claims, 7 Drawing Sheets

JACKET MATERIAL FOR PROTECTION OF ELECTRICAL CONDUCTORS

RELATED APPLICATIONS

The present application is a division of U.S. patent application Ser. No. 08/321,634 filed Oct. 11, 1994, now U.S. Pat. No. 5,579,172, which is a continuation-in-part of U.S. patent application Ser. No. 08/305,477 filed Sept. 13, 1994, now abandoned.

BACKGROUND OF THE INVENTION

1. Field of the Invention

The present invention relates to protective jacket material compositions with improved physical and electrical performance characteristics.

2. Description of Related Art

Electro-magnetic energy conductors, whether transmitting electrical current or light signals, are conventionally coated with a protective jacket. Such jackets may serve one or more of a host of functions, including providing electrical and/or thermal insulation, serving as a sheath to assist in containing multiple conductors, and providing physical protection for the conductor from attack or damage from environmental conditions or stresses applied to the conductor during use.

Among the successful jacket materials generally used today are polyvinyl chloride (PVC), polyurethane, polyimide, polytetrafluoroethylene (PTFE), expanded PTFE, fluorinated ethylene propylene (FEP), perfluoroalkoxy polymer (PFA), polyesters, silicone rubber, and nylon. These materials may be applied over the conductors in a variety of ways, including by extrusion, tape wrap, insertion within pre-formed tubes, shrink wrap, etc. The choice of material or materials and the manner or manners of application over a conductor are all design choices heavily dependent upon the required properties sought and the conditions anticipated for the conductor while in use.

In many cases, an additional physical structure may be incorporated into the jacket material or applied over it to impart improved physical characteristics. For instance, wire, glass fibers, polymeric fibers, and the like may be applied over a jacketed conductor to provide greater longitudinal strength or other physical characteristics not provided by a jacket alone. At other times, material may be combined to form a composite structure to provide such properties (e.g., silicone coated glass fiber braid, foil laminated polyesters, etc.).

Unfortunately, producing a correct balance between different properties may be extremely difficult for many applications. For example, it is often necessary to have a cable with a great deal of flexibility while being sufficiently strong to resist elongation or breakage if longitudinal strain is applied to the conductor. The use of a longitudinally strong jacket to relieve such stresses on a conductor is commonly referred to as "load sharing." Although it is a relatively simply matter to reinforce a conductor to produce good stretch resistance, typically such reinforcement significantly reduces other properties such as a wire's flexibility. With the use of very fine conductors (e.g., on the order of less than 0.25 mm), load sharing may be very important but must be balanced against loss of the flexibility of such wires.

Achieving an acceptable balance between these properties is often not possible. While a jacket of silicone has a high degree of flexibility, it provides very poor resistance to elongation, thus contributing virtually no load sharing to longitudinal forces. The reinforcement of such materials with wires or fibers imparts the needed longitudinal strength, but tends to simultaneously make the wire far less flexible.

Another concern often encountered is that many conductors are subjected to extremely harsh environmental conditions that can weaken or destroy conventional jacket materials. For instance, in medical applications it is commonly necessary to sterilize cabling with steam at high temperatures and pressures (e.g., in an autoclave) and/or with harsh chemicals. Many otherwise suitable materials are incapable of withstanding such treatments. Silicone and polyurethane are notoriously incapable of withstanding high temperature treatments and may be subject to degradation by certain chemicals. For example, silicone jacketed conductors tend to expand significantly during steam sterilization, requiring the use of a reinforcement material to avoid over-expansion and damage to the cable.

Porous, expanded PTFE, such as that made in accordance with U.S. Pat. No. 3,953,566 to Gore, has excellent dielectric properties and functions extremely well as a cable jacket for most applications. Among its desirable attributes are excellent strength and flexibility, high temperature resistance, and chemical resistance. Unfortunately, the porous nature of expanded PTFE may allow certain harsh chemicals (e.g., gluteraldehyde) to penetrate its interstices. At a minimum, this may result in undesirable wetting of the expanded PTFE jacket material. At worse, such chemicals can alter the properties of the jacket material (e.g., making the jacket less flexible) or even diminish performance of the cable by causing de-lamination or by attacking or interfering with the conductor itself. This risk of conductor damage may be of particular concern where exposure to such chemicals is combined with repeated high temperature and pressure stream sterilization treatments in autoclave cycling.

Another problem with a number of existing jacket materials is that they are too often limited in their handling requirements. Even extremely effective jacket material like expanded PTFE would be significantly improved if it could be produced with certain improved elastic properties. An expanded PTFE with improved axial elasticity may impart better abrasion resistance, improved cut-through resistance, and more forgiving handling characteristics.

It is accordingly a primary purpose of the present invention to provide a jacket material for conductors that provides good load sharing along the longitudinal length of a wire while contributing minimal resistance to flex.

It is a further purpose of the present invention to provide a jacket material that can withstand extremely rigorous use conditions, such as sterilization procedures, without compromise of the jacket or the conductor.

It is still another purpose of the present invention to provide a jacket material with a variety of improved handling properties, increasing both the range of possible uses for the jacket material and the ease of applying and using such material.

These and other purposes of the present invention will become evident from review of the following specification.

SUMMARY OF THE INVENTION

The present invention comprises an improved jacket composition for protecting wires, optical fibers, and other conductors. The jacket composition of the present invention is a composite of porous, expanded polytetrafluoroethylene (PTFE) matrix permeated with a silicone polymer that envelops the matrix structure of the expanded PTFE. Through the selection of the expanded PTFE matrix, the type of silicone material, and the method of application, the composite may be formed to be either elastic or inelastic in its longitudinal dimension (imparting load sharing where required) while retaining excellent axial flexibility through a broad temperature range.

The resulting unique composition produces a jacket material that retains some of the best characteristics of both expanded PTFE and silicone while diminishing or eliminating some of the deficiencies of each. Of particular interest is the ability of the jacket material to withstand harsh environmental conditions, such as repeated chemical and/or steam sterilization treatments, without degradation of either the jacket material or the conductor(s) it contains. Further, the composition of the present invention has a plethora of other improved handling qualities, including abrasion resistance, cut-through resistance, selective strain relief, selective elasticity, improved lubricity over elastomer alone, and the ability to be made fully biocompatible.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved protective jacket material suitable for covering a wide variety of electro-magnetic energy conductive materials, including electrically conductive cables transmitting electrical signals and fiber-optic cables transmitting light signals. The jacket of the present invention is particularly suitable for use in protecting cables that must withstand harsh environmental conditions, such as repeated steam sterilization treatments, or aggressive handling demands, such as repeated flexure.

The protective jacket of the present invention comprises a composite of a porous substrate of expanded polytetrafluoroethylene (PTFE) imbibed with a silicone elastomer material. This composite may be formed in the following manner.

First, an expanded PTFE material is produced, such as through the methods described in U.S. Pat. Nos. 3,956,566 to Gore and 4,187,390 to Gore, each incorporated by reference. For instance, an expanded PTFE tube may be formed from a mixture of PTFE resin (having a crystallinity of about 95% or above) and a liquid lubricant (e.g., a solvent of naphtha, white oil, mineral spirits, or the like). The mixture is thoroughly blended and then dried and formed into a pellet. The pellet is extruded into a tube shape through a ram-type extruder. Subsequently, the lubricant may then be removed through evaporation in an oven. The resulting tube material may then be subjected to uniaxial or biaxial stretching at a temperature of less than 327° C. to impart the desired amount of porosity and other properties to the tube. Stretching may be performed through one or more steps, at amounts varying from 1:1 or less up to 45:1. The resulting tube may then be subjected to a sintering temperature above 345° C. (i.e., the melting temperature of PTFE) to amorphously lock the tube in its expanded orientation.

Alternatively, a flat tape or membrane may be formed through a similar procedure except that the dried pellet is extruded into a flat sheet. Once expanded and amorphously locked, this sheet may then be cut into any desired shape, such as a tape suitable for spiral or cigarette wrapping around a conductor.

Figure 1:
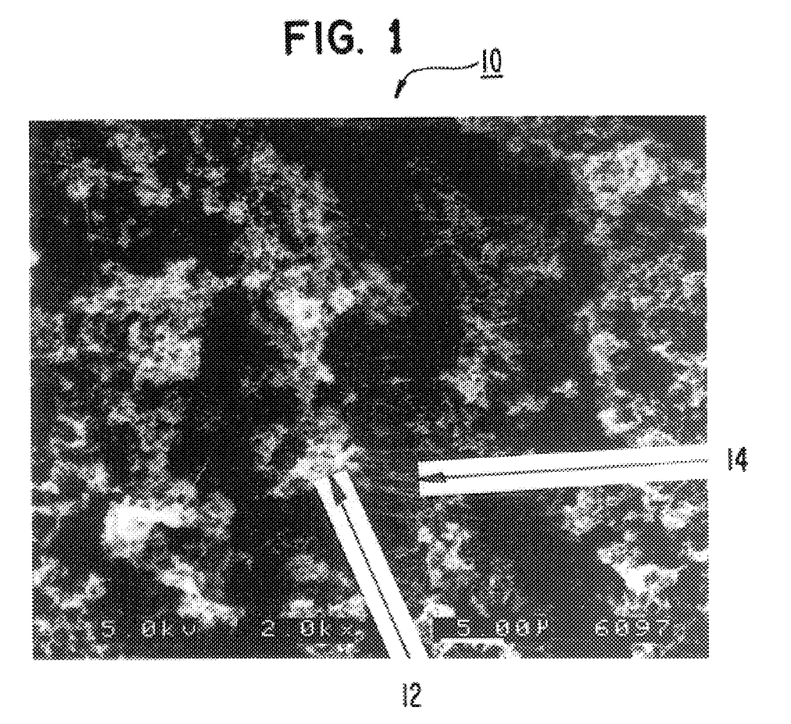
FIG. 1 is a scanning electron micrograph (SEM) of a composition of the present invention, enlarged 2,000 times, showing the polymeric nodes and fibrils structure coated with a low concentration of silicone material.

In both of these instances, a porous, expanded structure is obtained. As is shown in FIG. 1, the expanded PTFE structure 10 comprises polymeric nodes 12 interconnected by fibrils 14. Typical properties of such a structure comprise an average fibril length between nodes of 0.05 to 30 µm (preferably 0.2 to 10 µm), and a void volume of 20 to 70% (preferably 30 to 50%). As should be evident from the following description, the precise properties and dimension of expanded PTFE structures employed with the present invention are a function of application. The general membrane properties suitable for use with the present invention should include medium to high porosity, and wettability by various solvents, such as methylene chloride, toluene, and/or acetone.

The fibril length of expanded PTFE that has been expanded in single direction is defined herein as the average of ten measurements between nodes connected by fibrils in the direction of expansion. The ten measurements are made on a representative micrograph of an expanded PTFE sample. The magnification of the micrograph should be sufficient to show at least five sequential fibrils within the length of the micrograph. Two parallel lines are drawn across the length of the micrograph so as to divide the image into three equal areas, with the lines being drawn in the direction of expansion and parallel to the direction of orientation of the fibrils. Measuring from left to right, five measurements of fibril length are made along the top line in the micrograph beginning with the first nodes to intersect the line near the left edge of the micrograph, and continuing with consecutive nodes intersecting the line. Five more measurements are made along the other line from right to left, beginning with the first node to intersect the line on the right side of the micrograph. The ten measurements obtained by this method are averaged to obtain the average fibril length of the material.

Substrate material made through one of the above described methods and suitable for use in the present invention is commercially available in a wide variety of forms from a number of sources, including under the trademark GORE-TEX® from W. L. Gore & Associates, Inc., Newark, Del.

Once suitable porous, expanded PTFE substrate material is obtained, the following processing is performed to produce the composite material of the present invention. First a solution is formed by dissolving a silicone, such as a fluoro-silicone, in an organic solvent. The ratio of silicone to solvent should be in the range of 4:1 to 1:10 parts by volume, and preferably is in the range of 3:1 to 1:3 parts by volume. The solution is formed through any conventional means, such as by blending in a mechanical mixer under ambient conditions. Where high loading of silicone is desired, elevated temperatures may be employed below the boiling temperatures of the solvent.

The preferred solutions comprise a silicone material comprising a material soluble in one or more solvents capable of permeating and wetting out an expanded PTFE structure. The material preferably has a solids content of 95–100%, a specific gravity of between 0.95 to 1.5, and a viscosity between 300 and 150,000 centipoise. The material is preferably translucent in color. Further, the material preferably employs a one or two part cure system, ideally at an elevated temperature, to cure the liquid silicone into a rubber-like mass. It is particularly preferred to use a silicone with a platinum-type cure system that is activated at elevated temperatures to cross-link into a rubber-like substance.

It is suggested to select the silicone material from the group consisting of siloxane or polysiloxane having reactive groups, alkoxysilane or partially hydrolyzed forms thereof, and copolymeric siloxane having reactive groups. Known curing silicone rubber material compositions include normal temperature curing types, low temperature curing types, and high temperature curing types. Suitable silicones for use in the present invention include methylhydrogen siloxane, dimethylhydrogen siloxane, dimethyl siloxane, dimethylvinyl-terminated siloxane, dimethylmethylphenyl-methoxy silicone polymer, and the like. Additionally, the silicone can contain dimethylvinylated silica, trimethylated silica, methyltrimethoxysilane, and the like. Commercially available silicone for use with the present invention include Q3-6611, X1-4105, and Q1-4010, all available from Dow Corning, Corp., Midland, Mich.

Room temperature curing and high temperature curing compositions of silicone include two-pack types materials. Two-pack type materials deliver a silicone rubber having cross-linked structure by means of a reaction between siloxanes having reactive groups (e.g., SiOH, SiO—R (where R is an alkyl group), SiH, SiCH=$CH_2$ or the like) in the presence of a catalyst. The two-pack compositions are divided into condensation reaction types and addition reaction types.

The condensation reaction types include those employing: dehydration-condensation reactions between silanol and alkoxy siloxane; a de-alcoholation condensation reaction between silonal and alkoxy siloxane; and a dehydrogenation condensation reaction between SiH and silanol. The addition reaction types include those employing addition reaction between vinyl groups, alkyl groups, or other unsaturated groups and SiH.

A suitable curing catalyst is selected depending on the type of curing reaction desired. For example, metal, organic-metal salts, organic amines, quaternary ammonium salts, and the like are employed in reactions of condensation reactions types. Palladium or platinum back, platinum asbestos, chlorplatinic acid or other form of platinum are employed in reactions of addition reaction types. The above-mentioned compositions may also contain other materials, such as silicone oil, $SiO_2$, or fumed silica as property altering agents.

The preferred solvent comprises a solvent that both actively dissolves the silicone and is readily absorbed into structure of the intended polymeric substrate. For use with a PTFE substrate structure, a halogenated solvent, such as methylene chloride, acetone, or toluene, is particularly useful, as are commercially available solvents NORPAR-12 and ISOPAR-C. While methylene chloride has produced the best results to date, the carcinogenic nature of this solvent is objectionable for some applications. Accordingly, other preferred solvents continue to be sought.

The presently preferred composition comprises a mixture of 10–75% by weight of Q1-4010 silicone elastomer and 25–90% methylene chloride, acetone, or toluene solvent. This mixture is formed by stirring the solvent while adding the silicone elastomer at room temperature (about 22° C.) until the mixture has achieved a homogenous color. With an acetone mixture, the mixture should be re-stirred prior to each use due to precipitation of materials.

Once the silicone/solvent composition is formed, it can then be applied to any suitable microporous membrane. The preferred membrane for use with the present invention comprises the porous expanded PTFE material described above. Another membrane material which may be suitable for use with the present invention is expanded ultra-high molecular weight polyethylene and perhaps others that can be expanded into an open, porous network of nodes and fibrils.

The solution is applied to the porous PTFE material by spreading the composition evenly over the membrane and then allowing the composition to become absorbed therein. Preferably, the PTFE material is immersed within the solvent until it becomes saturated, such as by submerging the material in a bath of solution over a period of 1 to 5 minutes. The solution may be placed under reduced pressure, such as in a vacuum chamber, to facilitate complete filling of the porous polymeric substrate.

Once filled, the membrane and absorbed solution is exposed to an energy source, such as a heated oven set at 70° to 75° C. or above, for a period of 2 to 5 minutes or more to evaporate away any solvent. Ideally, evaporation comprises employing an oven heated to 85° C. or above and exposing the composition for at least 5 minutes. The evaporation of solvent can also be performed in one of the following manners: air drying for about a 5 hour period; or about 1 hour at about 50° C. in an explosion-proof oven.

When applied in this manner, it has been found that the porous PTFE material will become thoroughly impregnated with the silicone between its top and bottom surfaces. When applied to a flat membrane by spreading on one side, the bottom surface of the membrane (i.e., the surface opposite the side where the composition is applied) tends to have a tacky feel to it that may be desirable if the membrane is to be used as an adhesive layer.

By contrast, with some applications the top surface of the membrane has been found to have a powder-like material on it. This is believed to be a coating of silicon dioxide found as a filler in some commercial silicone materials. This material may be left in place for ease in handling or may be removed through any suitable means, such as through use of a solvent and/or mechanical scraping. Additionally, it may be possible to adjust the pore size of the membrane to allow the infiltration of filler or extraneous material into the membrane along with the silicone. Different silicone mixtures, both with and without silicone dioxide filler, are described in the examples set forth herein.

After impregnation, the composite material may then be subjected to appropriate conditions to cure the silicone material. For a Q1-4010 type silicone of Dow Corning Corp., a filled PTFE membrane can be cured by placing the composite material within an oven at about 110° C. for about 30 minutes.

The goal of the present invention is to provide a complete overlay of silicone over the polymeric nodes and fibrils of the membrane. Depending upon the conditions employed, the complete impregnation of the membrane may comprise simply covering the polymeric structure while leaving the microporous structure open to air permeation. Alternatively, the entire fibrillated interior of the membrane, including most or all of the porous structure therein, can be filled with the silicone.

Figure 2:
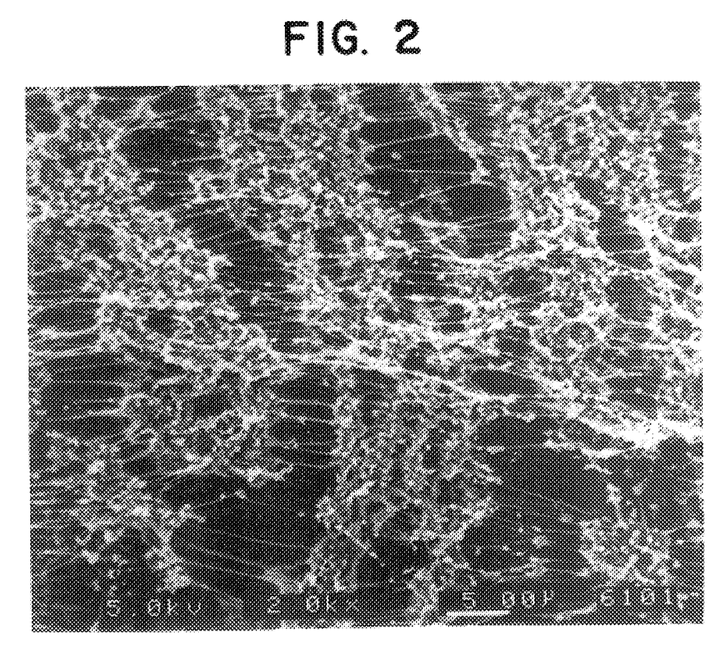
FIG. 2 is an SEM of a composition of the present invention, enlarged 2,000 times, showing the polymeric nodes and fibrils of the structure coated with a medium concentration of silicone material.

FIG. 2 shows the fibrillated PTFE structure, such as that shown in FIG. 1, with a medium coating of silicone polymer coating both the nodes and fibril structure of the polymer to form the composite of the present invention. The material was the result of placing an expanded PTFE membrane in a solution of 50% by volume of Q1-4010 silicone and a 50% by volume of ISOPAR-C solvent for 1 minute. This filled material was then heated in an oven for 10 minutes at about 110° C. to achieve a final product.

Figure 3:
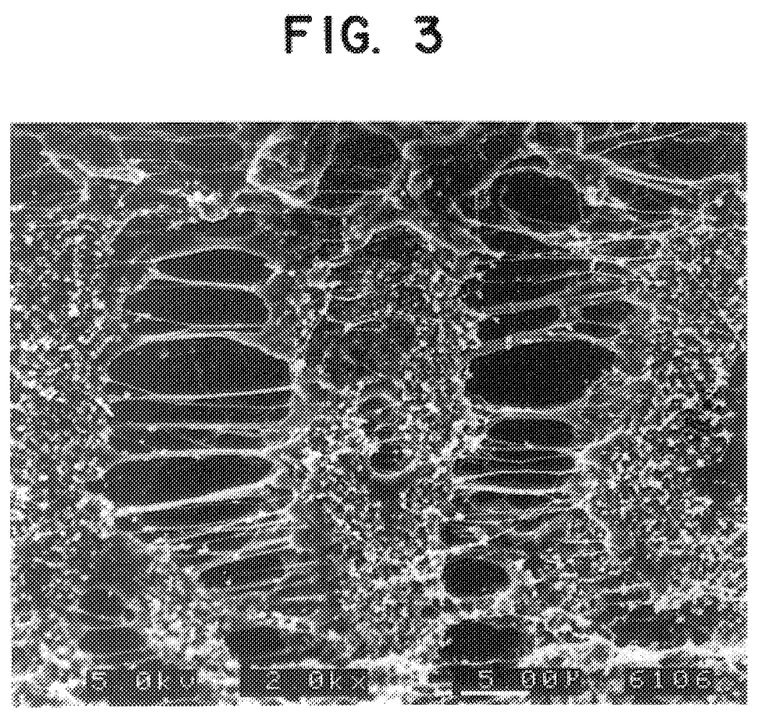
FIG. 3 is an SEM of a composition of the present invention, enlarged 2,000 times, showing the polymeric nodes and fibrils of the structure coated with a high concentration of silicone material.

FIG. 3 shows a fibrillated PTFE structure, such as that shown in FIG. 1, with a heavy coating of silicone polymer coating both the nodes and fibril structure of the polymer to form the composite of the present invention. As can be seen, the node and fibril structure of this material is thoroughly loaded with silicone. The material was the result of placing an expanded PTFE membrane in a solution of 75% by volume of Q1-4010 silicone and a 25% by weight of ISOPAR-C solvent for 1 minute. This filled material was then heated in an oven for 10 minutes at 110° C. to achieve a final product.

In either instance, the intent of the present invention is to produce a thoroughly impregnated composite membrane that has substantial elastomeric properties. In this respect, the degree of elasticity of the present invention can be measured in the following manner: a piece of treated and cured membrane is measured in length, stretched 2 times its length, released, and its new length re-measured. Resiliency is measured by compressing a given thickness of treated membrane to 50% its original height for 1 minute, releasing, and re-measuring its thickness.

To further aid in the impregnation process, the process of the present invention may be combined with other processes to achieve specific properties. For example, for some applications, such as use with very fine porous membranes, it may be desirable to impregnate the membrane with the silicone/solvent composition with the aid of a mechanical vacuum process. Other possible methods include use of mechanical pressure through either a pressure or vacuum process.

Once formed in this manner, the composite of the present invention may then be formed into conductor jacketing.

Figure 4:
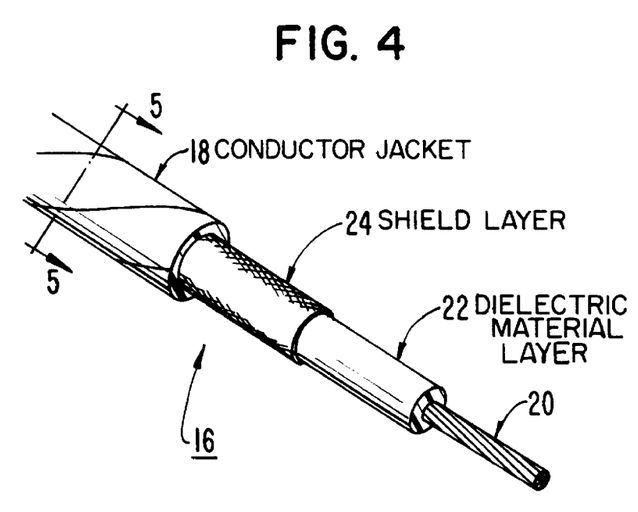
FIG. 4 is a three-quarter isometric view of a multiple layered coaxial cable including multi-stranded conductors, an insulative layer, a shield layer, and a wrapped jacket material of the present invention.
Figure 5:
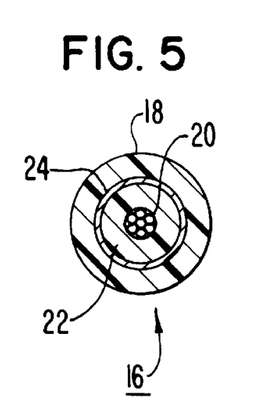
FIG. 5 is a cross-section view of the cable along line 5—5 of FIG. 4.

FIGS. 4 and 5 illustrate one example of a wire 16 protected with a jacket 18 of the present invention. In this instance, the wire 16 is a coaxial cable comprising a multi-strand center conductor 20, enwrapped in a dielectric material 22, in turn wrapped in a braided wire or foil shield 24. In order to protect these functional elements of the coaxial cable, the entire structure is then wrapped in a protective jacket 26. The jacket 26 illustrated comprises a tape formed from a composite membrane of the present invention that has been spiral wrapped around the shield 24. The jacket 26 may be held in place through any conventional mean, such as with adhesive applied between the jacket and the shield. Alternatively, the jacket 26 may be bonded to the shield 24 by wrapping the jacket on the cable prior to curing the silicone and then heating the assembled wire to the curing temperature of the silicone, causing the silicone to flow and adhere to the braid and itself.

This construction has proven to be very effective at protecting coaxial cables and the like. While use of silicone material alone as a jacket is desirable for its flexibility, it tends to have very poor resistance to elongation. This means that the material housed by the jacket must bear load place on portions of the jacket alone, with no "load sharing" proffered by the jacket. However, the composite material of the present invention retains the flexibility of silicone while significantly strengthening it to allow for substantial load sharing properties. In the case of coaxial cables and the like, this translates into more consistent signal transmission over the length of the cable, with less likelihood of distortion occurring when portions of the cable are placed under load.

Another advantage of a cable jacket made in accordance with the present invention is its ability to withstand harsh environmental conditions. As was previously explained, certain jacket materials such as silicone and polyurethane are known to have limited ability to withstand sterilization techniques or exposure to harsh chemicals. High temperature steam treatments will rapidly degrade silicone wire jackets, diminishing their flexibility and compromising their protective properties. The composite of the present invention is not so constrained. It has been found that expanded PTFE effectively protects the silicone material during steam sterilization procedures so that the material can withstand many more autoclave cycles with no impact on its performance. This makes the jacket material of the present invention particularly suitable for use with medical apparatus and other devices that experience repeated exposure to harsh environmental conditions.

Figure 6:
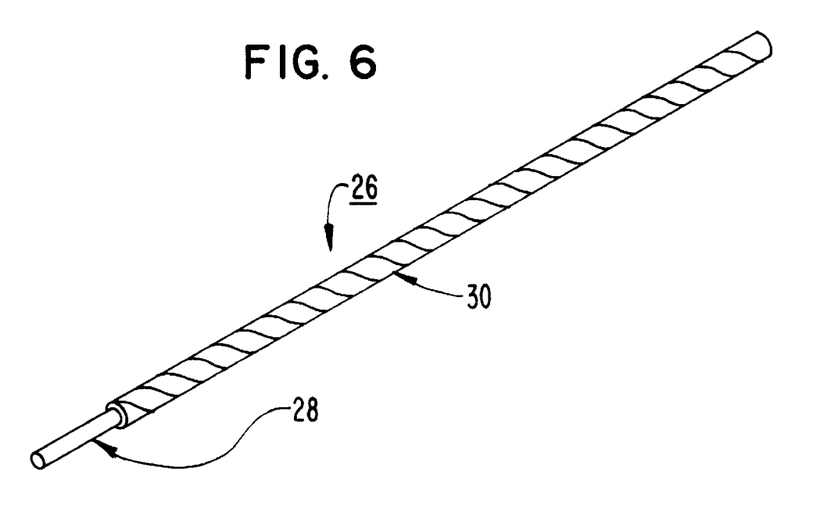
FIG. 6 is a three-quarter isometric view of a conductor tape wrapped with a jacket material of the present invention.

Another construction of the present invention is shown in FIG. 6. In this instance, a cable 26 comprises merely a center conductor 28 spiral wrapped with a composite tape jacket 30 of the present invention. This construction is suitable for a wide variety of applications, from mere metal electrical conductors to advanced fiber-optic cable construction. Again, this construction provides significant improvements in the handling characteristic of the wire, including improved load sharing and ability to be used under harsh conditions.

Figure 7:
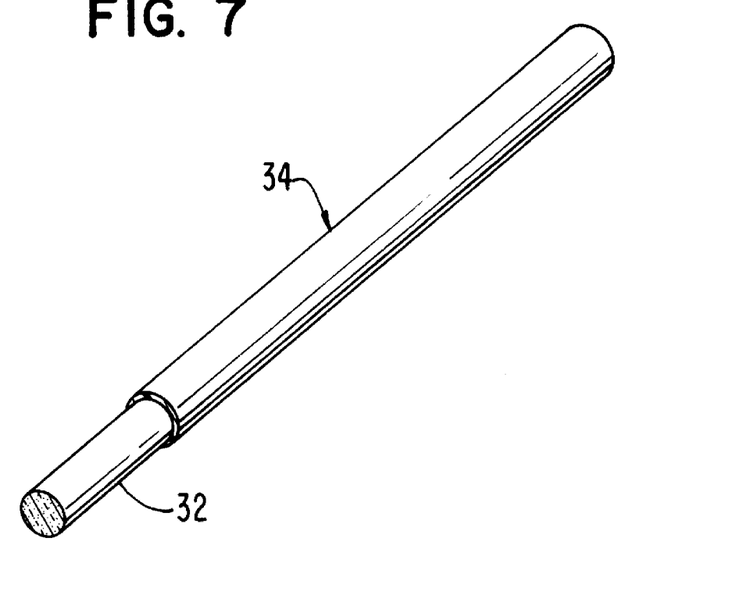
FIG. 7 is a three-quarter isometric view of a conductor sealed within a continuous tube of jacket material of the present invention.

The construction shown in FIG. 7 illustrates another suitable method for sealing virtually any form of conductor 32. In this case, a jacket 34 is formed from a continuous tube of composite material of the present invention. An expanded PTFE tube may be coextruded or otherwise formed over the conductor and then filled with silicone in place, or the composite tube may be formed in accordance with the present invention and then drawn over the conductor.

Figure 8:
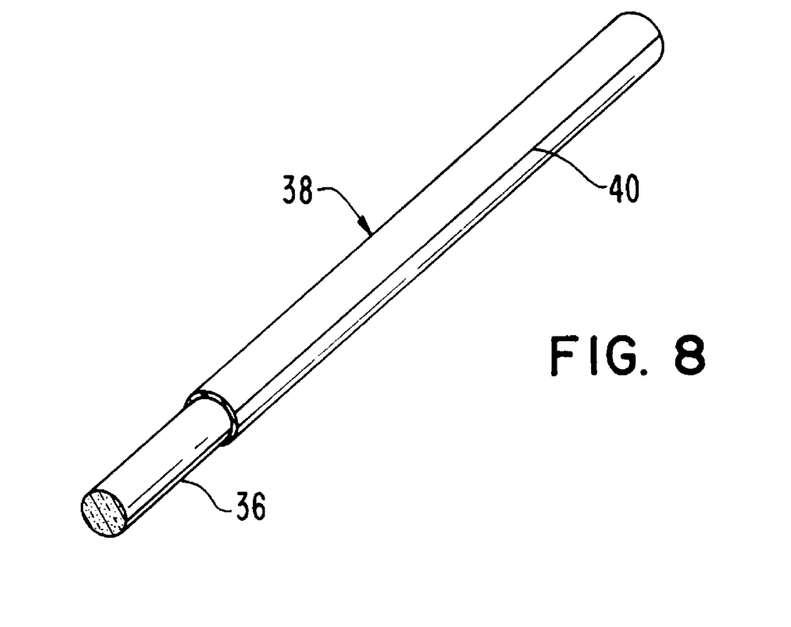
FIG. 8 is a three-quarter isometric view of a conductor "cigarette" wrapped within a tape of jacket material of the present invention.
Figure 9:
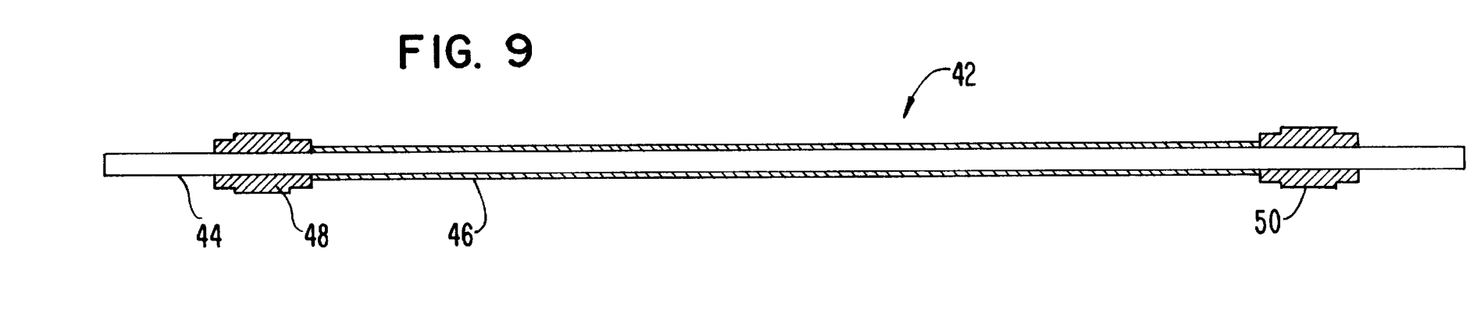
FIG. 9 is a side cross-section view of a multiple strand fiber optic cable sealed within a jacket material of the present invention.

Another effective means of wrapping a conductor 36 with a jacket 38 of the present invention is shown in FIG. 8. Here a relatively wide tape is wrapped longitudinally around the conductor in a "cigarette" wrap fashion. A single seam 40 is formed down the length of the conductor and may be held in place through any of the adhesion methods previously described.

Figure 10:
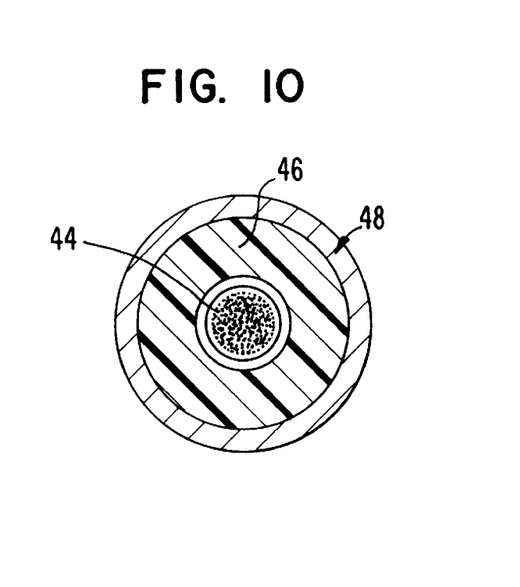
FIG. 10 is an end view of a multiple strand fiber optic cable sealed within a jacket material of the present invention.
Figure 11:
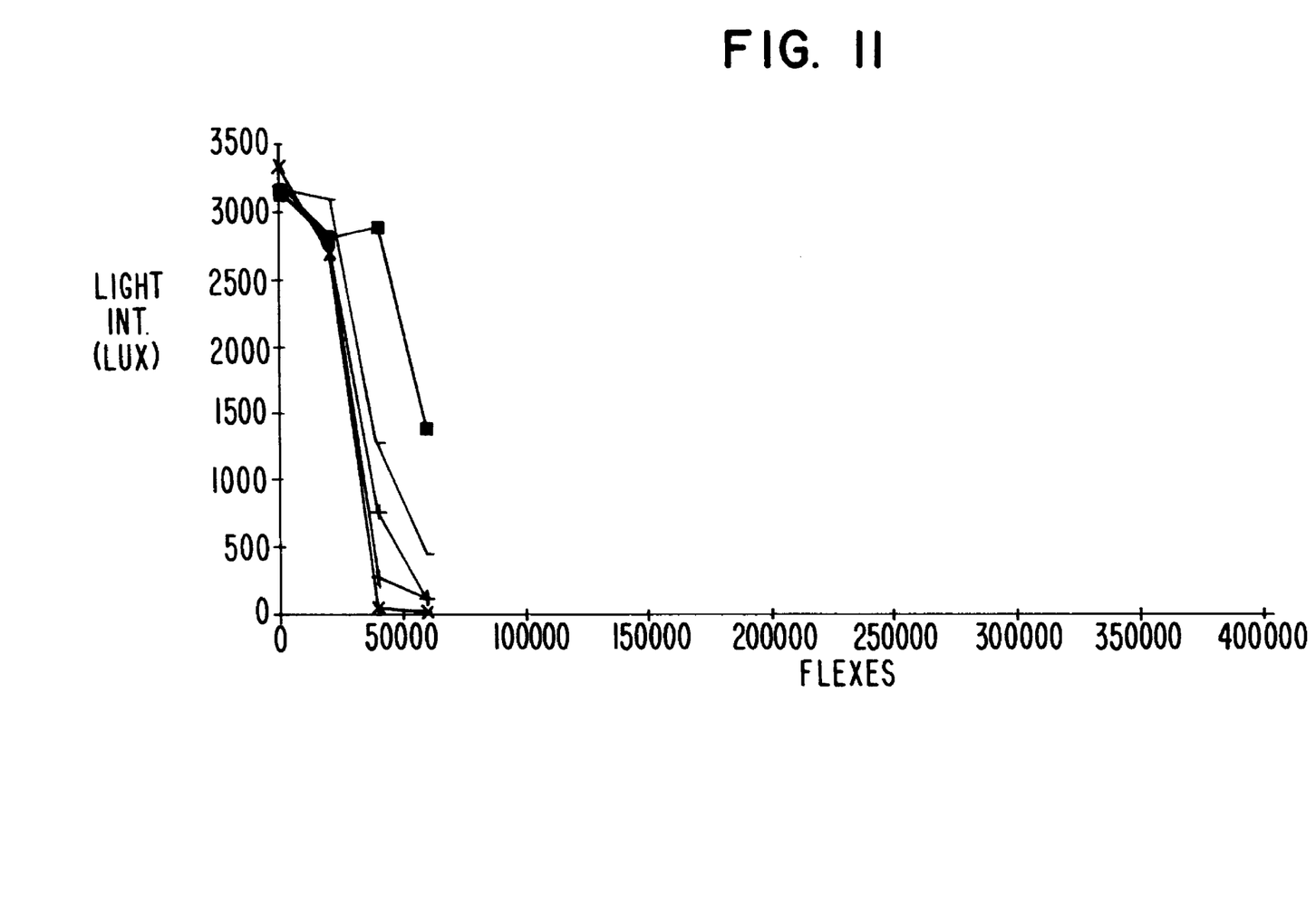
FIG. 11 is a graph showing flex test results on commercially available samples of jacketed fiber-optic cable.

One area of particularly growing interest for the composite of the present invention is as a jacketing for single or multiple arrays of fiber-optic conductors. One construction for use in this area is shown in FIGS. 10 and 11. A fiber-optic cable assembly 42 is shown comprising a multiple strand fiber-optic conductor 44 wrapped in a tube of composite jacket material 46 of the present invention. Each end of the jacket 46 is terminated with stainless steel end connectors 48, 50 that are glued in place with epoxy adhesive. As is explained in greater detail below, this construction has produced dramatic improvement in flexure resistance of these cables.

Two of the particularly important aspects of the present invention are the improved properties it provides in both resistance to compression and in its ability to repeatedly withstand high temperature treatments without degradation. With regard to compression resistance (or "resilence"), the wire jacket of the present invention will withstand compression in its axial dimension of 75% with a rebound of at least 50% to its original dimensions. This is a notable improvement over many presently available materials, such as conventional expanded PTFE, which have minimal crush resistance. With regard to the temperature resistance of the present invention, it has the ability to withstand repeated exposure to temperature in excess of 250° C. without significant degradation. This property makes it particularly suitable for demanding applications, such as uses demanding repeated sterilization.

A further improvement of the jacket material of the present invention can be achieved by filling the expanded PTFE structure with particles or material which enhance one or more properties. For instance, the jacket material may include conductive shielding properties by including electrically conductive particles within the expanded PTFE. In a preferred embodiment, the jacket material may include particles, fibers, or other fillers of one or more of the following: carbon, graphite, aluminum, silver plated aluminum, copper, copper alloy, iron, iron alloy, nickel, cobalt, gold, silver or silver plated copper, or the like. Filler content preferably comprises 5–85% by volume of the PTFE/filler composition. A preferable composition of PTFE filler for use as a jacketing tape includes the filler comprising 30 to 50% by volume of the mixture. Material made in this manner will also provide shielding against electrical and electromagnetic effects.

Alternatively, the jacket may be constructed of expanded PTFE that has been plated with a metal. Such a plating process is described in U.S. Pat. Nos. 4,557,957 and 4,720,400 both to Manniso, incorporated by reference. Preferred metal plating materials include silver, silver-copper alloys, gold, cobalt, platinum and copper alloys and most preferably copper, nickel, and tin.

Without intending to limit the scope of the present invention, the following examples illustrate how the present invention may be made and used:

EXAMPLE 1

A composite membrane suitable for use as a jacket of the present invention was produced in the following manner. A silicone adhesive material was acquired from Dow Corning Corp., of Midland, Mich., under the designation Q3-6611. The Q3-6611 contains dimethyl, methylhydrogen siloxane copolymer, dimethylvinylated and trimethyled silica and quartz. This material comprises one part gray colored thick flowable liquid having a viscosity of 95,000 centipoise. After curing, but before impregnation in an expanded PTFE structure, the material has a durometer measurement of Shore A 60, tensile strength of 700 psi, and an elongation of 125%.

The silicone material was mixed in a halogenated solvent of methylene chloride (an aqueous solution of 50% by weight). Mixing was performed by stirring the solution at room temperature until a homogenous color formed.

The composite material of each of the mixtures was applied to sample membranes of expanded PTFE made in accordance with U.S. Pat. No. 3,953,566 to Gore, incorporated by reference.

Coating was performed by using a wheel transfer procedure whereby a 25 foot long by 6 inch wide by 0.008 inch thick piece of unsintered expanded PTFE material was transported via a pay-off and take up reel system over a rotating drum partially submersed in the silicone solvent mixture. The drum was rotated in a direction opposite the direction of material travel. A blade was positioned after the drum such that as the impregnated material travels across it, excess silicone material was scraped off.

The extent of silicone penetration was unexpected and caused the uncoated side of the membrane to become sticky. This stickiness caused the membrane to drag and stick to the plenum that the membrane travels across for drying of the solvent before being reeled up. Twenty (20) feet of impregnated membrane was produced using this procedure.

Once coated in this manner, the membrane was cured for ten (10) minutes in an oven at 150° C. The pieces of membrane had very good elastic properties and did not show the usual cold flow characteristics of silicone.

Inspection of this membrane revealed that the side to which the silicone had been applied had a thin layer of powder-like material on it. This is believed to be a silicone dioxide deposit, which is a filler material found in the Q3-6611 silicone. The other side of the membrane had a sticky or tacky feeling indicating that the silicone completely penetrated the membrane. The essentially opaque white membrane also became translucent through this penetration.

In order to establish adhesive qualities on both sides of this membrane, the powder layer was removed from some of the samples by scraping the uncured membrane using a blade.

In order to demonstrate one application of the present invention, the sheets produced were placed in alternating layers with flexible printed circuit board material. This composite was then placed in a heated press at 500 lbs at 150° C. for ten minutes. The resulting flexible composite had excellent adhesion between the layers and some elastic properties.

EXAMPLE 2

Another mixture was created employing a silicone without a filler material. This material was a Dow Corning Q1-4010 Silicone Conformal Coating. The Q1-4010 contains dimethyl, methylhydrogen siloxane copolymer, dimethyl siloxane, dimethylvinyl-terminated silica and trimethylated silica. The silicone was thinned using a solvent of methylene chloride. Mixing was again accomplished by stirring at room temperature until a homogenous color is produced.

Instead of a wheel coater machine, application to a membrane material identical to that employed in Example 1 was performed by placing the membrane material on a layer of silicone release paper. A 50:50 by weight mixture of silicone and methylene chloride was poured onto the membrane and wiped across the entire surface until a uniform translucence was achieved.

This same procedure was performed on a number of expanded PTFE membrane samples. Each of the samples was then cured for 10 minutes at 150° C.

EXAMPLE 3

A tubular composite material of the present invention was produce in the following manner and was tested as a wire jacket in the manner described below.

A dispersion of polytetrafluoroethylene was prepared in the following manner. A PTFE resin acquired from E. I. duPont de Nemours and Company was mixed with 17% by volume lubricant of ISOPAR-C. This mixture was compressed into a pellet at 200 psi. The pellet was then extruded through a ram-type extruder at 300 psi to form an extruded tube. The extruded tube was dried at about 300° C. for about 5 seconds. The tube was then expanded 4:1 at a line speed of 24 feet/min. The expanded tube was then sintered at 395° C. for 17 seconds. The resulting tube had a density of about 0.5 g/cc and a nominal wall thickness of about 0.030 inches.

By placing a wire assembly within the above described tube, a composite wire jacket of the present invention was produced in the following manner. The tube and wire assembly were submerged in a solution of silicone and solvent (ISOPAR-C) per the table below. One sample of each type cable was obtained for testing. The seven samples are described as follows:

| Samples No. | % Loading of Silicone | Silicone Resin No. | P.R. No. |
|---|---|---|---|
| 1 | 25 | Q1-4010 | N/A |
| 2 | 50 | Q1-4010 | N/A |
| 3 | 75 | Q1-4010 | N/A |
| 4 | 25 | X1-4105 | N/A |
| 5 | 50 | X1-4105 | N/A |
| 6 | 100 | Q7-4750 | 83-W1036-04 |
| 7 | 0 | N/A | N/A |

Each of these samples were then tested using the following equipment:

Instron 4201 Universal Tester with 1000 lb. Tensile Load Cell
100 lb. Compression Load Cell
0.003" Radius, 0.250" Wide Blade Fixture
Delron Insulation Spacer
Short Detector
Teledyne Taber Model V-5 Stiffness Tester
90° Tik Tok Tester
Pelton-Crane Validator Plus Autoclave The cables were evaluated using the following procedures.

1. The test samples were tested for stiffness using the Taber Model V-5 Stiffness Tester and following the manufacturers recommended procedure.

2. The test samples jackets were removed, dimensions taken, and tensile strength testing performed using the Instron 4201 Universal Tester with the following procedure:
   (a) Cut sample to be tested into 6 inch lengths and remove the sample core;
   (b) Obtain overall OD, wall thickness, and jacket ID by measurement of jacket material;
   (c) Set-up Instron 4201 using the manufacturers recommended procedures with the 1000 lb. load cell and allow to stabilize;
   (d) Set the crosshead speed at 2 inches per minute and the sample clamps at 1 inch apart;
   (e) Install the sample to be tested into the clamps and pull;
   (f) Make several sample pulls, record the "Peak" values for each pull, then average the values for an average peak force;
   (g) Using the equation below, compute the average PSI for the sample being tested and record:

$$\frac{\text{Avg. Peak}}{((D^2 - (D - 2W)^2)/4)\pi} = \text{Avg. } PSI$$

3. The test sample jackets were tested for cut-through resistance using the Instron 4201 Universal Tester and the following the Requesting & Performing Cable Crush Test Procedure, Document No. 06-00021-01, in the following manner:

Particular parameters:
100 lb. Compression Cell
0.05 in/min.
0.003" Radius, 0.250" Wide Blade Fixture Procedures:
   (a) Cut sample to be tested into 6 inch lengths and remove the sample core;
   (b) Note overall OD, Wall Thickness, and jacket ID measured in previous test;
   (c) Set-up Instron 4201 using the manufacturers recommended procedures with the 100 lb. compression load cell and allow to stabilize:
   (d) Set the crosshead speed at 0.05 inches per minute and install the delron spacer and the 0.003" radius blade fixture;
   (e) Install the sample to be tested onto the 0.003" radius, 0.250" wide blade fixture and attach the short detector, red lead to the load cell and the black lead to the fixture;
   (e) Make several sample compressions, stopping the crosshead when the short detector detects a short and record the "Peak" value for each compression. Average the values for an average peak force and record.

4. The test samples were installed on the 90° Tik Tok Tester and flexed following the Requesting & Performing Cable Flex Test Procedure, Document No. 06-00034-01 in the manner described below, to evaluate the jacket material resistance to flexing. The set up for the test was as follows:

Mandrel OD—0.320"
Flex Rate—15 cycles per minute
Tension—1 lb.
Cycles Completed 496,653
    Sample evaluation—No failure of jackets, no cracks, no splits, etc., all samples Electrical testing was not performed during the flexing since only jacket evaluation was desired.

The procedure for the test was as follows:
   (a) The sample material was mounted in a Tik Tok Tester;
   (b) The sample was then exposed to repeated 90° folds, in opposite directions, over the mandrel at the stated flex rate;
   (c) The samples were visually evaluated upon completion of the designated number of cycles.

5. One sample of No. 5 was autoclaved using the Pelton-Crane Validator Plus Autoclave and following the manufacturers recommended procedures. The individual cycle definitions were as follows:

Temperature 270°–274° F.
Pressure 30–38 PSI
Duration 5 minutes (d) The sample was connected to a 200/50 Point Break Detect Box;

(e) The tester was run at 15±1 cycles per minute until failure occurred;

(f) Upon failure, the number of cycles to failure were noted.

The final results of the above tests are summarized below.

| Test Sample No. | Taber Stiffness (gm – cm) | Tensile Strength (PSI) | Cut-Through (lbs) | Flex Test | Post Autoclave Tensile Strength Test (PSI) | Post Autoclave Cut-Through Test (lbs) |
|---|---|---|---|---|---|---|
| 1 | 66.7 | 7565 | 33.67 | No Failure | N/A | N/A |
| 2 | 79.2 | 7577 | 34.45 | No Failure | N/A | N/A |
| 3 | 89.2 | 8363 | 32.19 | No Failure | N/A | N/A |
| 4 | 71.7 | 7368 | 31.42 | No Failure | N/A | N/A |
| 5 | 89.2 | 5359 | 32.77 | No Failure | 7783 PSI | 42.0 |
| 6 | 115.0 | 1385 | 22.45 | No Failure | N/A | N/A |
| 7 | 56.25 | 8012 | 47.57 | No Failure | N/A | N/A |

Tensile strength and cut-through tests were performed, as described above, after autoclaving to determine any material property changes.

6. Samples 6 & 7 are control samples, with No. 6 being a 100% silicone jacket material and No. 7 being a conventional 100% expanded PTFE tube mounted as a jacket over a wire assembly.

7. The samples were tested for crush resistance in the following manner:

(a) A sample of cable was prepared for electronic monitoring, with all center conductors connected together and attached to approximately an 18 inch lead. All shields were connected together and were also attached to an 18 inch lead. The opposite end of the test sample was exposed and the wires separated to prevent accidental shorting;

(b) An INSTRON 4210 Universal Tester was employed having a 100 lb. compression load cell with a flat plate installed. A 0.003" radius Blade Fixture was installed on the Universal Tester;

(c) The leads from the test sample was attached to a SLAUGHTER Series 103/105-MP Hi-Pot Tester;

(d) The test sample was positioned over and perpendicular to the 0.003" radius blade. The blade was positioned at one end of the sample so as to allow it to work its way up the sample;

(e) The compression cell was positioned to just touch the test sample, with crosshead speed set at less than 1.0 inch per minute;

(f) The Hi-Pot tester was set at 500 V DC with a current limit of 10 mA;

(g) The Universal Tester compressions cycle was then initiated while watching for a short in the sample. When a short is indicated, readings were taken.

8. Flex testing was performed in accordance with the following procedure:

(a) A sample was prepared for electrical monitoring, with a daisy-chain of conductors connected together and attached to approximately 18 inch leads at each end;

(b) One end of the sample was installed into a clamp in a 180° Cork Screw Flex Tester;

(c) The sample was then twisted three rotations (counter-clockwise) and then connected to the opposite clamp;

The following conclusions were reached with regard to the above testing:

Taber Stiffness Tests

The Taber Stiffness test is an indication of the flexibility of the test sample. The higher the Taber number, the stiffer the sample. The value is a relative reference in gauging stiffness of one test sample with another. Test sample No. 6 (100% silicone jacket) data was obtained from test data taken from previous production lots. This is the value used in test for customer acceptance.

The test indicated a trend within the two resin types, with an increase in stiffness developing as the percent of loading increases. The samples Nos. 1, 2 & 3 (Q1-4010 resin) indicated a slightly higher level of stiffness at the same percent loading compared to the samples Nos. 4 & 5 (X1-4105 resin).

Comparing the samples to the control samples, all samples were more flexible than the silicone control and less flexible than the ePTFE jacketed control.

Tensile Strength Tests

The tensile strength test also indicated a similar trend as the Taber test illustrated but with one slight deviation. The samples Nos. 1, 2, & 3 (Q1-4010 resin) increase, but sample No. 5 (X1-4105 resin) does not show the increase expected. No explanation noted. The relationship between the control samples Nos. 6 & 7 also slightly different with the sample No. 3 being higher than the sample No. 7. No explanation noted. The minimum value for test sample No. 6 is 1200 PSI per the suppliers data sheet for the Q7-4750 material.

Cut-Through Tests

The cut-through test was performed using the 0.003" radius, 0.250" wide blade fixture at a crosshead speed of 0.05"/minute and recording the maximum force required to penetrate one thickness of the jacket material. Tests conducted on different configurations indicated that the thickness of the sample had no effect on the maximum force required to penetrate the material, it only affected the time duration before the short was noted.

Flex Tests

The flex test results showed no failures. No cracks, splits, or wrinkles were noted. The only results noted was the normal jacket discoloration found during all flex tests and this is attributed to the use of aluminum mandrels.

Autoclave Tests

The post autoclave tensile strength and cut-through tests were performed, as described above, on the only test sample that was autoclaved. This test sample was noted to be No. 5. The results indicated that the tensile strength and cut-through were increased due to autoclaving.

The following table summarizes testing results on samples produced above and tradition silicone jacket over a multi conductor core of silver plated copper conductors.

| RATIO Si:SOLV | Si MATERIAL | TABER STIFFNESS (g/cm) | TENSILE STRENGTH (PSI) | CUT THROUGH (lbs) | POST AUTO-CLASE TENSILE (PSI) | POST AUTO-CLAVE CUT THROUGH (lbs) |
|---|---|---|---|---|---|---|
| 1:3 | Q1-4010 | 66.7 | 7565 | 33.67 | N/A | N/A |
| 1:1 | Q1-4010 | 79.2 | 7577 | 34.45 | N/A | N/A |
| 3:1 | Q1-4010 | 89.2 | 8363 | 32.19 | N/A | N/A |
| 1:3 | X1-4105 | 71.7 | 7368 | 31.42 | N/A | N/A |
| 1:1 | X1-4105 | 89.2 | 5359 | 32.77 | 7783 | 42.0 |
| Si ONLY | SEE NOTE | 115.0 | 1385 | 22.45 | N/A | N/A |

Note: This jacket was a conventional extruded SILASTIC Q7-4750 liquid silicone resin compound available from Dow Corning Corp.

This example provided over 12 times the tensile strength of a conventional silicone jacket and was inelastic in the longitudinal axis. This characteristic allows this invention to provide for longitudinal strain relief while remaining extremely flexible. With conventional silicone jacket this longitudinal strain relief must be provided by wire or fiber braid or stranding.

EXAMPLE 4

A flat film of the present invention was produced in the following manner.

A dispersion was produced using a mixture of 145 cc of ISOPAR-K per pound of duPont T-3512 resin. The mixture was extruded using a Gore double cavity die in a ram-type extruder. The extruded material was then calendered from 0.026" thick to 0.006" thick. This material was then calendered again to 0.0042" thick. The resulting material was then dried. The dried, calendered material was then expanded at a rate of 3.55:1 nominal expansion rate at a line speed of 130 feet/min. Finally, the expanded material was sintered at a temperature of about 369° C. The resulting material had the following properties: 0.75 gm/cc density; 70% porosity; 12 psi bubble point; 10,610 psi matrix tensile strength in the longitudinal axis of the membrane; 3.55:1 nominal expansion ratio; 2,735 psi matrix tensile strength in the transverse axis of the membrane; and an inverted cup moisture vapor transmission rate (MVTR) of 8300.

These membrane properties were determined in the following manner:

Density was determined by measuring the dimensions of the material and calculating its weight per unit area.

Porosity was determined by calculating the sample's intrinsic density using a Micromeritics Model 1310 autotychometer. The procedure followed was: to evacuate the sample of air by using helium by exposing the sample to a helium-filled environment for 5 minutes; to determine the bulk density of the sample through an Archimedes method of water displacement of a 1"×1" sample; and to calculate the porosity in accordance with the following calculation:

Porosity=1-((bulk density)/(intrinsic density))×100%.

The Bubble Point of porous PTFE was measured using isopropyl alcohol following ASTM Standard F316-86. The Bubble Point is the pressure of air required to blow the first continuous bubbles detectable by the their rise through a layer of isopropyl alcohol covering a 1 inch circular sample. This measurement provides an estimation of maximum pore size.

The tensile strength was determined in accordance with ASTM D-882 (Tensile Properties of Thin Plastic Sheeting) using an Instron Tensile Tester, Series IX. The cross-head speed of the tensile tester was set at about 20 inches/min and the gage length was set at 2 inches.

The Moisture Vapor Transmission Rate (MVTR) was determined by mixing approximately 70 ml of a solution consisting of 35 parts by weight of potassium acetate and 15 parts by weight of distilled water and placing it into a 133 ml polypropylene cup, having an inside diameter of 6.5 cm at its mouth. An expanded polytetrafluoroethylene (PTFE) membrane having a minimum MVTR of approximately 85,000 g/m$^2$/24 hrs. (as tested by the method described in U.S. Pat. No. 4,862,730 to Crosby) and available from W. L. Gore & Associates, Inc. of Newark, Del., was heat sealed to the lip of the cup to create a taut, leak proof, microporous barrier containing the solution. A similar expanded PTFE membrane was mounted to the surface of a water bath. The water bath assembly was controlled at 23° C. plus 0.2° C., utilizing a temperature controlled room and a water circulating bath.

The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g and was placed in an inverted manner onto the center of the test sample. Water transport was provided by the driving force between the water in the water bath and the saturated salt solution providing water flux by diffusion in that direction. The sample was tested for 5 minutes and the cup assembly was then removed, weighed again within 1/1000 g. The MVTR of the sample was calculated from the weight gain of the cup assembly and was expressed in grams of water per square meter of sample surface area per 24 hours.

The expanded PTFE sheet made as described above was then submersed in a mixture of 3:1 by volume of Dow Corning Q1-4010 silicone and ISOPAR-C solvent in the manner described above using a wiper ("doctor") blade to remove excess silicone from the surface of the membrane. The initial membrane had the following properties: After treatment in a 3:1 mix:

The composite material thus produced was then spiral wrapped around a coaxial cable, such as in the construction shown in FIGS. 4 and 5. Once wrapped, the wrapped cable was place in an oven at 110° C. for 15 minutes to cure the silicone material and bond the composite jacket to the coaxial cable.

After curing, the material forms a predominately homogeneous jacket over the conductor assembly. This construction method allows for the manufacture of an extremely thin jacket in the range of 0.0005 inches to 0.100 inches in wall thickness. Testing of this jacket showed significantly improved properties over either silicone or expanded PTFE jackets alone, including: better cut-through resistance; better abrasion resistance; and improved lubricity over silicone jacket material. The final material was tested to have the following properties: a matrix tensile strength of 6068 psi in the longitudinal direction and 2048 psi in the longitudinal direction; a density of 1.253; and a MVTR of 203.

The presence of expanded PTFE establishes a radial constraint on the conductor assembly. This radial constraint is particularly useful in the manufacture of high frequency coaxial transmission lines as it imparts electrical loss stability to the transmission line.

EXAMPLE 5

The following examples that further processing of the composite material of the present invention may be employed to achieve even more improved properties.

A three foot tube composite was manufactured in accordance with Example 3, above. Each end of the tube and including 2 inches extending inward from each end was submerged in a solution of 1:1 parts by volume of Dow Corning Q1-4010 silicone and ISOPAR-C solvent. The tube ends were removed from the solution and placed in an oven at 120° C. for 30 minutes to cure the silicone. The tube was then submerged in its entirety in the solution and allowed to permeate completely. Upon permeation the tube was removed from the solution and placed in the oven as above for 30 minutes.

The resulting tube in this example had a more rigid area at either end of the tube than in the center. This technique may be employed to produce a tube with increased rigidity at any desired location or locations along its length. This allows for enhanced strain relief of a transmission line placed into the tube and terminated with connectors or clamped in the area of increased rigidity.

EXAMPLE 6

A composite tube of the present invention was made in accordance with the method described in Example 3, above, except with an expansion ratio of 5:1 and a line speed of 7.5 feet/min. The resulting tube had a wall thickness of 0.030 inches.

The extruded tube was submerged in a 1:3 solution of Dow Corning Q1-4010 silicone and ISOPAR-C solvent. The tube was then removed and wrapped onto a mandrel being held at each end of the tube. The tube and mandrel were then place in an oven for 30 minutes at 110° C.

The final composite jacket had an outside diameter (O.D.) of 0.300 inches and an inside diameter (I.D.) of 0.180 inches.

A bundle of optical fibers was then pulled through this composite jacket with the aid of a guide wire. The optical fiber bundle had an O.D. of 0.137" and each fiber had an O.D. of 0.002 inches. The optical fibers were made of borosilicate glass.

Each end of the cable was terminated by inserting the fiber bundle into a stainless steel end connector. Epoxy adhesive was used to glue the fiber bundles to the end connectors and to each other. Finally, the end faces (i.e., cross-section of end connector containing the fiber optic bundle) were polished of optical transmission measurement.

Two cable assemblies were manufactured in this manner. The cables were tested in a flex tester according to EIA standard FOTP 104. For comparison, two commercially available cables were also tested. The commercial cables contained straight fiber bundles in a conventional silicone jacket.

Figure 12:
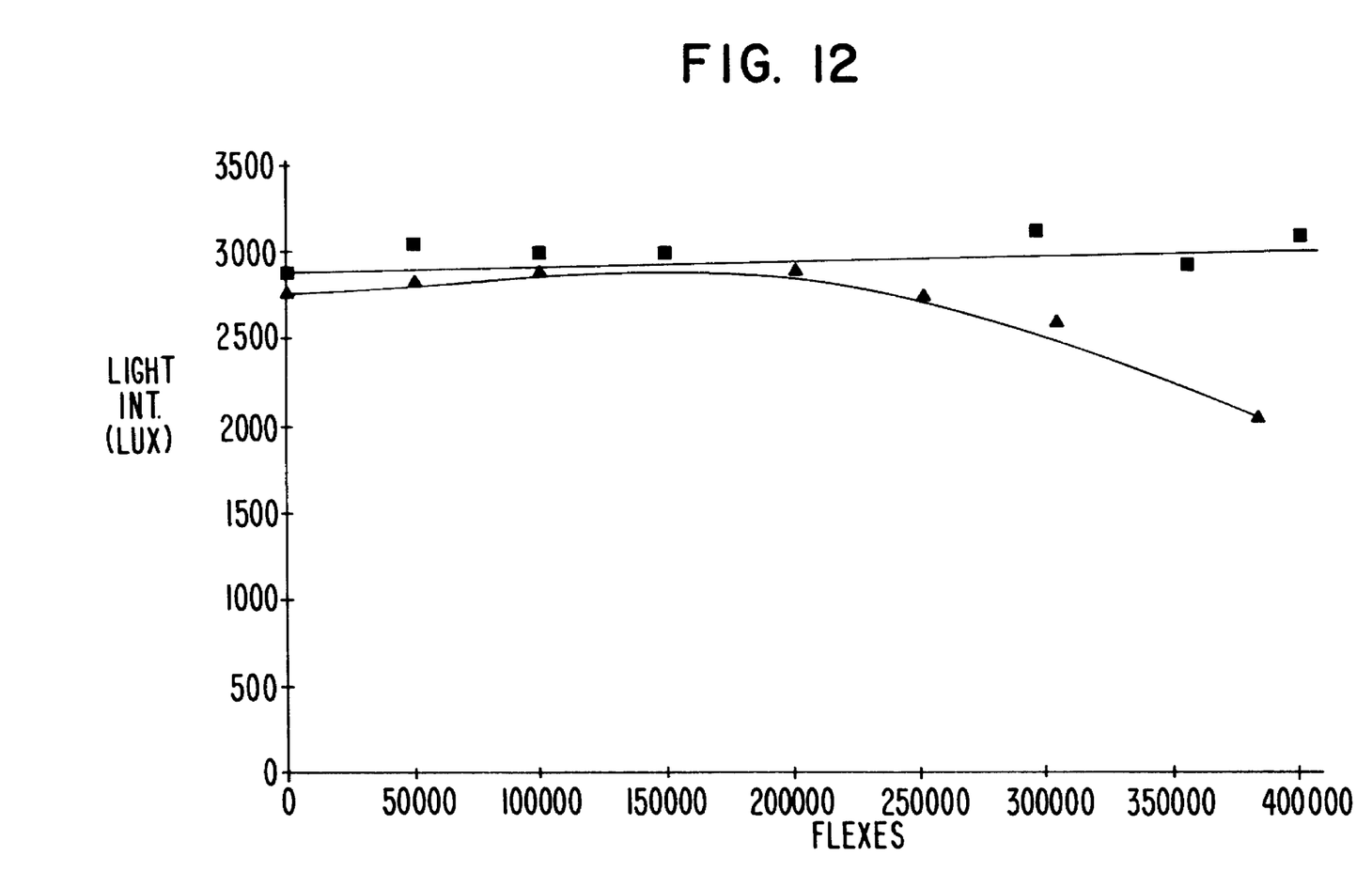
FIG. 12 is a graph showing flex test results on two samples of fiber optic cables sealed within the jacket material of the present invention.

The test results for these cables are reflected in the graphs of FIGS. 11 and 12. FIG. 11 illustrates the performance of the commercially available cables. This graph demonstrates that failure of these cables occurred rapidly, with five cables failing after only 30,000 cycles of flexure, and another cable failing after only 60,000 cycles of flexure.

By contrast, FIG. 12 illustrates the performance of the two cables made in accordance with the present example. As can be seen, one of these two cables failed after 430,000 cycles of flexure and one continued to show no degradation at that stage.

While particular embodiments of the present invention have been illustrated and described herein, the present invention should not be limited to such illustrations and descriptions. It should be apparent that changes and modifications may be incorporated and embodied as part of the present invention within the scope of the following claims.

EXAMPLE 7

Several samples of ePTFE were impregnated with X1-4105 and Q1-4010 silicone diluted in toluene. The ratio of silicone to toluene was 3:1. These samples were cured and then submerged in pure toluene. The samples were removed and inspected for any loss visible degradation in physical characteristics over the next 72 hours. Although the smapes did show signs of swelling and weight gain, they continued to have good tensile, abrasion and resilient properties. After removing the samples and allowing them to dry they were weighted again. The sample with X1-4105 showed a 2.3% weight loss while the sample with Q1-4010 exhibited a 1.3% weight loss. Since the silicone represents more than 50% of the composite weight these losses in weight are insignificant.

When 0.005" thick sheets of silicone rubber were soaked for 72 hours they swelled, became disfigured and became very sensitive to superficial damage. The slightest nick or damage to the surface would rapidly propagate through the sheet when placed under tension.

As such, the composite of the present invention will withstand exposure to harsh chemicals without significant degradation of the material. The term "harsh chemicals" is intended to encompass solvents, such as toluene and similar solutions, as well as other liquid and gaseous materials that are commonly employed in the cleaning and/or sterilization of cables are wire jackets. Many of these chemicals will rapidly degrade silicones when not protected by the ePTFE structure of the present invention.

The invention claimed is:

1. A method for producing a jacket for a conductor that comprises:

providing a micro-porous substrate of polytetrafluoroethylene (PTFE) material;

providing a silicone elastomer;

mixing the silicone elastomer with a solvent to form a composition that will freely penetrate the PTFE material upon contact;

applying the composition to the PTFE material so as to cause the composition to envelop the micro-porous structure of the PTFE material;

removing the solvent from the membrane to leave a composite jacket material; and placing the jacket material around the conductor so as to protect the conductor during use.

2. The method of claim 1 that further comprises providing a solvent selected from the group consisting of methylene chloride, toluene, and acetone;

mixing the silicone and solvent in a proportion of 0.1:1 to 3:1 by weight.

3. The method of claim 1 that further comprises forming the composite jacket material into a tape; and placing the jacket material around the conductor by wrapping with the tape.

4. The method of claim 1 that further comprises forming the composite jacket material into a tube; and placing the jacket material around the conductor by surrounding it with the tube.

5. The method of claim 1 that further comprises providing a PTFE material that is inelastic in a longitudinal direction.

6. A method for producing an improved jacket material for a conductor which comprises:

providing a polymer membrane including a microporous structure;

providing a solution of silicone elastomer and solvent mixed to form a liquid composition that will freely penetrate the microporous structure of the membrane;

coating the membrane with the composition so as to allow the composition to impregnate the microporous structure completely;

subjecting the impregnated membrane to an energy source to remove the solvent and cure the silicone elastomer within the membrane to form a silicone elastomer impregnated membrane; and wrapping the conductor with the silicone elastomer impregnated membrane so as to form a jacket around the conductor.

\* \* \* \* \*